Jan. 10, 1933.  R. C. ZUCKERMAN  1,893,512
METHOD OF AND MEANS FOR DISTRIBUTING FERTILIZER
IN CONJUNCTION WITH SEED PLANTING
Filed March 12, 1929
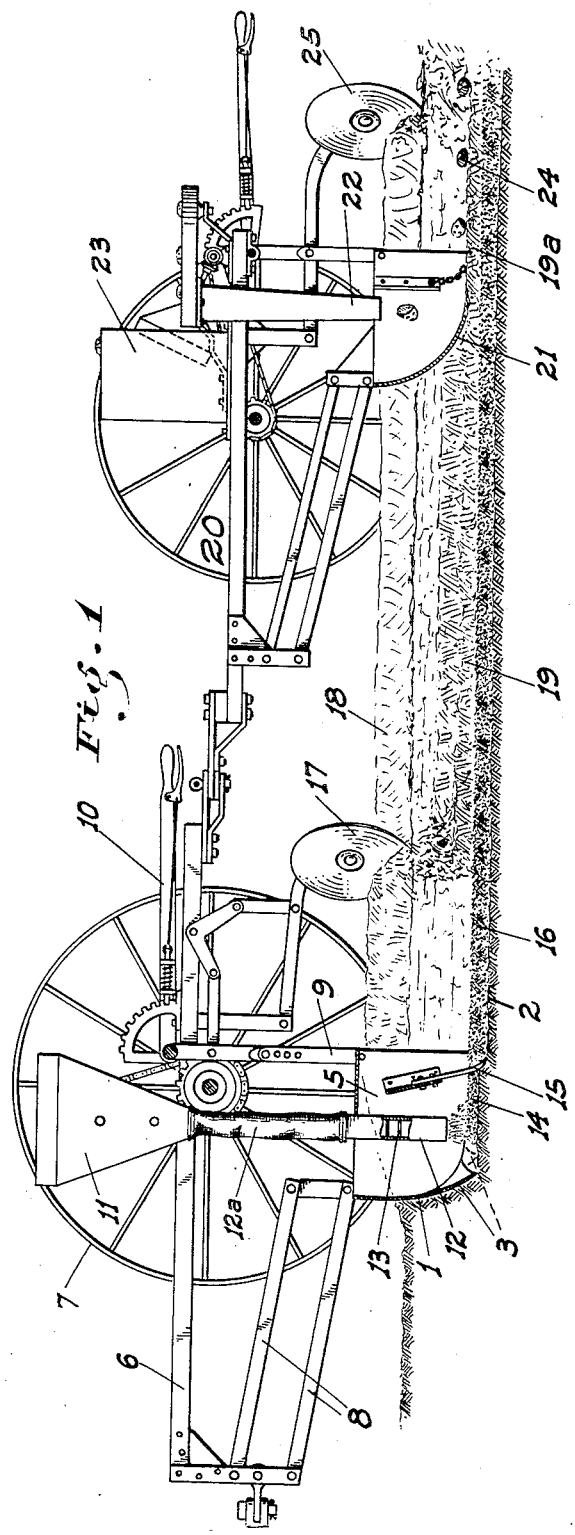
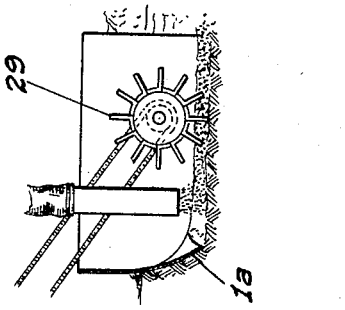
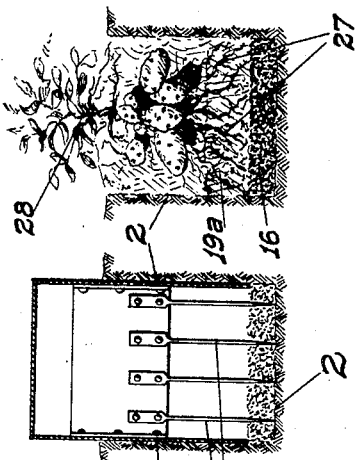
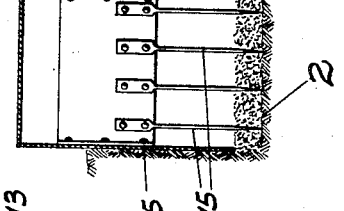
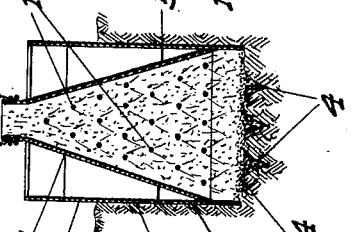
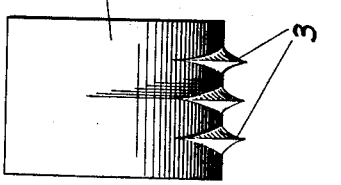
INVENTOR
*R.C.Zuckerman*
BY
ATTORNEY Patented Jan. 10, 1933

1,893,512

UNITED STATES PATENT OFFICE

ROSCOE C. ZUCKERMAN, OF STOCKTON, CALIFORNIA

METHOD OF AND MEANS FOR DISTRIBUTING FERTILIZER IN CONJUNCTION WITH SEED PLANTING

Application filed March 12, 1929. Serial No. 346,431.

This invention relates to the preparation of ground for the planting of seed, especially potatoes, and particularly relates to the preparation and fertilizing of the seed bed and the planting of the seed therein.

Up to the present time the method of applying fertilizer to potato ground and the like has been to apply the fertilizer on top of the ground either by hand or by the method known as "broadcasting", or to apply it with the planter.

In the method of applying the fertilizer by hand it was dropped in the open furrow in which the seed had been already deposited.
Some of the fertilizer consequently fell directly on the seed, some of it dropped into the bottom of the furrow and some stayed toward the top of the furrow. That portion which dropped in the bottom and did not actually come in contact with the seed was of some benefit. Wherever the fertilizer came in direct contact with the seed caustic action followed and the seed rotted. Where the fertilizer was deposited on the top of the furrow it would lay in dry soil where the roots were unable to come in contact with it and were not benefited thereby.

As machines came into use implement manufacturers employed fertilizing attachments to the planters. These all provided means for dropping the fertilizer in the same furrow with the seed and the fertilizer was deposited directly on top of the seed. This of course met with disastrous results and had to be discontinued. In order to overcome having the fertilizer drop on the seed a broadcasting system was used. This deposits the fertilizer on top of the ground and afterwards the soil is plowed. It can be readily seen however that only some of the fertilizer is actually left in the bottom of the furrow, and at least half of it when plowed under is above the center of the seed bed where no roots grow and therefore is of no avail.

Potatoes are usually planted in rows twenty eight inches apart. The roots extend from the center line in all directions but very seldom over eight or ten inches from such line. Due to the fact that potatoes are cultivated between the rows, any roots that might grow there are always disturbed and pulled out. The result is that with the broadcasting method of distributing the fertilizer there are at least twelve inches or more between the rows where fertilizer has been deposited but where the roots are unable to reach it.

In the method of applying the fertilizer through the planter shoe and directly with the seed a very narrow ribbon is deposited not over three inches in width. Such a ribbon cannot of course have any beneficial effect on the roots extending laterally from the plants.

After studying over the situation very carefully I reached the conclusion that it would be extremely advantageous to deposit this fertilizer at the proper depth below the top of the soil and in a wide ribbon so that the roots of the plant would come in contact with a correspondingly large area of ground concentrated with the fertilizer. To accomplish the above end is one of the major objects of my invention.

It is also necessary and advantageous to have this area of fertilized ground directly removed from the seed pieces to prevent caustic action and rotting, and to accomplish this feature has been another and important object of my invention.

As a result of the use of my method in connection with the planting of potatoes it will be found that 500 pounds of fertilizer per acre placed in the manner defined hereinafter will give better results than 2000 pounds placed by any other previously known method.

The saving is not only made and apparent in the use and cost of the fertilizer but in the vastly increased crop obtained due to the correct application of the fertilizer on the ground, and where the roots of the plants can and do come in contact with the fertilizer at all times without any bad effects.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Fig. 1 is a sectional elevation of my improved apparatus for preparing the seed bed and planting the seed, and by means of which my process may be carried out.

Fig. 2 is a front end of the furrow digging shoe.

Fig. 3 is a cross section of the shoe plates and fertilizer distributing chute.

Fig. 4 is a cross section through the shoe plates rearwardly of said chute showing the scarifying teeth.

Fig. 5 is a cross section through a planted furrow showing in a fanciful manner the growth of a potato plant.

Fig. 6 is a sectional elevation of a furrow forming shoe unit showing a modified form of scarifier.

Referring now more particularly to the characters of reference on the drawing, the numeral 1 denotes a shoe of a width to form the furrow 2 and of a depth sufficient to extend into the ground for the depth of the furrow and still project somewhat above the surface of the ground. This shoe preferably has a rearward curvature toward its lower end and is formed on the bottom with transversely spaced wedge-shaped teeth 3 which depend below the level of the major portion of the lower edge of the shoe so as to dig below the bottom of the main furrow and form auxiliary furrows 4, which are of course transversely spaced relative to the main furrow.

Side plates 5 are secured to and extend rearwardly from the shoe a certain distance, being the same height as said shoe so as to prevent dirt from immediately dropping back into the formed furrow. This shoe unit is supported from a frame 6 mounted on wheels 7 which straddle the furrows, said unit being preferably connected to said frame by forwardly extending draft bars 8 and by links 9 connected to a lever 10 mounted on the frame so that said shoe unit may be raised or lowered as may be required to alter its operating depth.

Mounted on the frame is a fertilizer hopper 11 of standard character from which the fertilizer drops into a vertical chute 12. This chute is relatively short lengthwise of the machine but diverges transversely toward its lower end to extend the full distance between the side plates of the shoe unit to which plates said chute is secured at such end. Deflector bars 13 are arranged in staggered relation in the chute so that the fertilizer as it drops will be distributed evenly over the entire bottom surface of the furrows, the feed from the hopper as usual being constant with the advance of the machine along the ground so that said fertilizer forms a layer of substantially even thickness throughout, as indicated at 14.

Fixed in rigid connection with the shoe plates 5 rearwardly of the fertilizer chute is a plurality of vertical scarifier teeth 15 adapted to depend into the ground a short distance below the bottom of the auxiliary furrows, and positioned to engage the dirt between such furrows. The action of these teeth eradicates the auxiliary furrows and mixes the bottom dirt and the fertilizer together so as to form a composite layer of dirt and fertilizer 16 rearwardly of the scarifier.

Mounted in connection with the frame rearwardly of the shoe unit and to the sides of the furrow are discs 17 positioned to engage the pile of dirt 18 deposited on the ground to the sides of the furrow by the advancing shoe and to deflect at least part of such dirt back into the furrow to provide a layer of loose dirt 19 over the fertilized area.

Flexibly secured to the rear end of the frame 6 is a wheel mounted potato planting machine of standard character indicated generally at 20. A vertically adjustable shoe 21 of similar character to the shoe 1 but without the furrow digging teeth is mounted in connection with and depends from the planting machine so as to engage the dirt discharged into the furrow by the discs 17 and both smooth down such dirt and leave enough of the same above the fertilized layer to prevent the seed from coming in contact with such layer, while keeping the top of the smoothed down dirt the necessary distance below the ground level for proper planting purposes. A chute 22 from the seed piece hopper 23 depends into the furrow made by the shoe 21 and as usual deposits the seed pieces 24 onto the smooth dirt layer 19a in suitably spaced relation to each other. Discs 25 or other dirt deflecting means mounted in connection with the planter behind the same then engage the remainder of the piles of dirt 18 and deflect the same back into the furrow to cover the planted pieces.

If found advisable or desirable a rotary scarifying device 26 as shown in Fig. 6 and driven with the advance of the machine may be used in connection with the shoe 1a instead of the fixed teeth 15 as first described.

The portion of the fertilizer chute between the bottom of the hopper and the top of the diverging portion 12 is in the form of a cylindrical member 12a of flexible character, such as a portion of a tire-tube. This enables the shoe to be raised or lowered without disturbing the rigid portion 12 or interfering with the feeding of the fertilizer.

From the foregoing description it will be seen that the objects of my invention have been attained in that the fertilizer is discharged over the entire width of the furrow, while being confined in a space where it is of value, and so that the seed pieces are not actually in contact with the fertilizer. At the same time the fertilizer is so positioned relative to the roots 27 of the growing plant 28 (see Fig. 5) that such roots have easy access to all the fertilizer, as is necessary to produce the best results.

It will be evident that if the mixing elements 15 or 29 are not used, the various furrows will remain undisturbed, and the bottom of the furrow as a whole will be of varying depth. The fertilizer as deposited will therefore cover and follow the irregular ground contour formed by the auxiliary and main furrows.

Then after the fertilizer has been covered with dirt and the seed pieces planted, the first and relatively short roots to grow engage the fertilizer at the relatively shallow depth, or that between the auxiliary furrows. The secondary and longer roots, as they grow and their length increases, pass beyond the level of the topmost fertilizer deposits, and engage the hitherto unused fertilizer deposited at the greater depth, or that in the auxiliary furrows. The growth and health of the plants are therefore increased and benefited, since the roots are fertilized and nourished as they grow, and not merely at the start of their growth.

Though I have shown and described only one shoe and associated parts it is to be understood that there are as many transversely spaced shoes mounted in connection with the one supporting frame as there are said planting units, of which there are usually three on one machine so that three rows are prepared and planted simultaneously.

Having thus described my invention what I claim as new and useful and desire to secure by Letters Patent is:

1. A method of preparing a seed-planting bed including forming a relatively wide furrow, depositing fertilizer in the bottom of the furrow, over the full width thereof, and covering the deposited fertilizer for the full width of the furrow with a relatively shallow layer of dirt.

2. A method of preparing a seed-planting bed including forming a furrow, depositing fertilizer in the bottom of the furrow, over the full width thereof, mixing the deposited fertilizer over its entire width with the bottom dirt of the furrow, covering said mixture with a shallow layer of dirt, depositing the seed on said layer, and filling in the furrow over the seed.

3. A method of preparing a seed-planting bed including forming a furrow, and at the same time causing the dirt from the furrow to be heaped on top of the ground alongside the furrow, depositing fertilizer in the bottom of the furrow, mixing such fertilizer with the bottom dirt of the furrow, covering the mixture with some of the heaped-up dirt originally removed from the furrow, planting the seed, and covering the seed with the remainder of the originally removed dirt, all in one continuous operation.

4. An apparatus for preparing a seed bed including a shoe to be depressed into the ground and to be moved along to form a furrow, side plates connected to and extending rearwardly from the shoe, means mounted in connection with the shoe to deposit fertilizer into the bottom of the furrow between the side plates, means mounted in connection with the shoe rearwardly of the fertilizer depositing means for mixing the fertilizer with the bottom dirt of the furrow, and means arranged rearwardly of said mixing means for covering over said mixture with a layer of dirt prior to the planting of the seed.

5. An apparatus for preparing a seed bed including a shoe to be depressed into the ground and to be moved along to form a furrow, side plates connected to and extending rearwardly from the side edges of the shoe, a fertilizer hopper above the shoe, a discharge chute from the hopper extending downwardly between the plates and arranged to deposit fertilizer into the bottom of the furrow over the full width thereof, and means mounted in fixed connection with the plates for mixing said fertilizer with the bottom dirt of the furrow.

6. An apparatus for preparing a seed bed including a shoe to be depressed into the ground and to be moved along to form a furrow, said shoe being shaped to form a plurality of transversely spaced and relatively small furrows in the bottom of the main furrow, means mounted in connection with and rearwardly of the shoe for depositing fertilizer into the bottom of said furrows over the full width of the main furrow, and scarifying means mounted in connection with the shoe rearwardly of the fertilizer depositing means for engaging the bottom dirt of the main furrow between the auxiliary furrows to mix such dirt with the fertilizer.

7. A method of preparing a seed-planting bed including forming a relatively wide furrow, depositing a layer of fertilizer in the furrow evenly over the entire width thereof, and covering the deposited fertilizer for the full width of the furrow with a layer of dirt prior to the planting of the seed.

8. An apparatus for preparing a seed bed including means to dig a relatively wide furrow, means mounted in connection with the digging means to deposit a layer of fertilizer into the furrow evenly over the entire width thereof, and means to then cover the entire layer of fertilizer with a layer of dirt.

9. An apparatus for preparing a seed bed including means to dig a relatively wide and flat bottomed furrow, rearwardly extending side plates projecting upwardly from the digging means at the sides thereof, a fertilizer hopper mounted in connection with and above the plates, and a discharge chute from the hopper; the side walls of the chute diverging from the hopper to lower-end terminations against the plate.

10. An apparatus for preparing a seed bed including means to dig a relatively wide furrow, rearwardly extending side plates projecting upwardly from the digging means at the side thereof, a fertilizer hopper mounted in connection with and above the plates, and a discharge chute from the hopper; the side walls of the chute diverging from the hopper to lower-end terminations against the plate, and deflector elements arranged in staggered relation in the chute and disposed at different levels to cause the fertilizer as it drops through the chute to be spread and distributed evenly over the entire width thereof as such width increases.

11. A method of preparing a seed bed including digging a relatively wide furrow, digging a plurality of transverse spaced and relatively narrow furrows in the bottom of said wide furrow, and then depositing fertilizer over the entire bottom surfaces of said main and auxiliary furrows.

12. A method of preparing a seed bed including digging a relatively wide furrow, digging a plurality of transversely spaced and relatively narrow furrows in the bottom of said wide furrow, then depositing fertilizer over the entire bottom surfaces of said main and auxiliary furrows, and subsequently covering all such fertilizer with dirt.

13. An apparatus for preparing a seed bed including in combination: a means for digging a furrow, means for depositing fertilizer into the furrow, means for then mixing the fertilizer with the bottom dirt of the furrow, means for then covering the mixture with a shallow layer of dirt, means to then deposit seed in the furrow, and means to cover the seed.

In testimony whereof I affix my signature.
ROSCOE C. ZUCKERMAN.